US012621158B2

(12) United States Patent
Ulrich

(10) Patent No.: US 12,621,158 B2
(45) Date of Patent: May 5, 2026

(54) TWO FACTOR AUTHENTICATION DEVICES WITH ACCESSIBILITY FEATURES

(71) Applicant: Wells Fargo Bank, N.A., San Francisco, CA (US)

(72) Inventor: Amy Christine Ulrich, Phoenix, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 61 days.

(21) Appl. No.: 18/581,144

(22) Filed: Feb. 19, 2024

(65) Prior Publication Data

US 2025/0267004 A1 Aug. 21, 2025

(51) Int. Cl.
*H04L 9/32* (2006.01)

(52) U.S. Cl.
CPC .......... *H04L 9/3226* (2013.01); *H04L 9/3234* (2013.01); *H04L 9/3247* (2013.01); *H04L 9/3268* (2013.01)

(58) Field of Classification Search
CPC ... H04L 9/3226; H04L 9/3234; H04L 9/3247; H04L 9/3268
USPC .......................................................... 713/156
See application file for complete search history.

(56) References Cited

U.S. PATENT DOCUMENTS

| | | | | |
|---|---|---|---|---|
| 5,444,768 | A * | 8/1995 | Lemaire ................ | H04M 3/533 |
| | | | | 379/85 |
| 6,542,623 | B1 * | 4/2003 | Kahn ................... | G09B 21/025 |
| | | | | 434/114 |

| | | | | |
|---|---|---|---|---|
| 7,194,620 | B1 * | 3/2007 | Hayes ..................... | H04L 9/321 |
| | | | | 713/157 |
| 8,769,624 | B2 | 7/2014 | Cotterill | |
| 9,047,473 | B2 | 6/2015 | Samuelsson et al. | |
| 9,092,643 | B2 | 7/2015 | Keoh et al. | |
| 9,537,661 | B2 | 1/2017 | Khalil et al. | |
| 9,769,157 | B2 | 9/2017 | Ibrahim et al. | |
| 10,299,118 | B1 | 5/2019 | Karachiwala et al. | |
| 2002/0073045 | A1 | 6/2002 | Rubin et al. | |
| 2003/0051083 | A1 * | 3/2003 | Striemer ........... | H04M 1/72412 |
| | | | | 710/72 |
| 2004/0243856 | A1 * | 12/2004 | Shatford ............... | G07C 9/257 |
| | | | | 726/5 |
| 2006/0094401 | A1 | 5/2006 | Eastlake | |

(Continued)

FOREIGN PATENT DOCUMENTS

| | | |
|---|---|---|
| CN | 106782572 | 4/2020 |
| CN | 112805967 | 8/2023 |

(Continued)

OTHER PUBLICATIONS

Henwyn et al., "An Effective Approach to Speech-Based Email Assistance for Visually Impaired People," 2025 8th International Conference on Trends in Electronics and Informatics (ICOEI), Tirunelveli, India, 2025, pp. 627-632, doi: 10.1109/ICOEI65986. 2025. 11013019. (Year: 2025).*

(Continued)

*Primary Examiner* — Peter C Shaw
(74) *Attorney, Agent, or Firm* — SCHWEGMAN LUNDBERG & WOESSNER, P.A.

(57) ABSTRACT

Two-factor authentication code generation devices are described which include accessibility features and/or additional authentication features to ensure an identity of a user.

28 Claims, 6 Drawing Sheets

(56) References Cited

U.S. PATENT DOCUMENTS

| | | | |
|---|---|---|---|
| 2007/0005963 A1 | 1/2007 | Eldar et al. | |
| 2007/0117553 A1* | 5/2007 | Arnos | H04M 1/72436 |
| | | | 455/414.4 |
| 2007/0174904 A1 | 7/2007 | Park | |
| 2007/0203850 A1* | 8/2007 | Singh | G07F 19/207 |
| | | | 705/67 |
| 2008/0072303 A1* | 3/2008 | Syed | H04L 63/0807 |
| | | | 726/10 |
| 2020/0050749 A1 | 2/2020 | Barboi | |
| 2021/0366309 A1* | 11/2021 | Kolar | G09F 9/377 |
| 2022/0148378 A1 | 5/2022 | Verschoor et al. | |
| 2022/0261147 A1* | 8/2022 | Welch | G06F 3/0484 |
| 2024/0289798 A1 | 8/2024 | Koshy et al. | |
| 2025/0267144 A1 | 8/2025 | Thompson | |

FOREIGN PATENT DOCUMENTS

| | | | |
|---|---|---|---|
| KR | 20100136339 | 12/2010 | |
| KR | 20100136367 | 12/2010 | |
| KR | 101499906 | 3/2015 | |
| KR | 101561499 | 10/2015 | |
| KR | 102157344 | 9/2020 | |
| WO | WO-2010101476 A1 * | 9/2010 | G06F 21/35 |
| WO | 2018113526 | 6/2018 | |

OTHER PUBLICATIONS

Fuglerud et al., "Secure and Inclusive Authentication with a Talking Mobile One-Time-Password Client," in IEEE Security & Privacy, vol. 9, No. 2, pp. 27-34, Mar.-Apr. 2011, doi: 10.1109/MSP.2010. 204. (Year: 2011).*

Banerjee et al., "Tap Based User Authentication on Smartphones for Visually Impaired People," 2018 9th International Conference on Computing, Communication and Networking Technologies (ICCCNT), Bengaluru, India, 2018, pp. 1-7, doi: 10.1109/ICCCNT.2018. 8494056. (Year: 2018).*

Patil et al., "NetraAadhaar: A Deep Learning-Driven Aadhaar Verification Platform for the Aid of Visually Impaired, " in IEEE Access, vol. 13, pp. 74229-74251, 2025, doi: 10.1109/ACCESS. 2025.3563786. (Year: 2025).*

Goodrich et al., "Loud and Clear: Human-Verifiable Authentication Based on Audio," 26th IEEE International Conference on Distributed Computing Systems (ICDCS'06), Lisboa, Portugal, 2006, pp. 10-10, doi: 10.1109/ICDCS.2006.52. (Year: 2006).*

Chen et al., "Audio-visual integration in multimodal communication," in Proceedings of the IEEE, vol. 86, No. 5, pp. 837-852, May 1998, doi: 10.1109/5.664274. (Year: 1998).*

Zhang et al., "Reconfigurable PDA for the Visually Impaired Using FPGAs, " 2008 International Conference on Reconfigurable Computing and FPGAs, Cancun, Mexico, 2008, pp. 1-6, doi: 10.1109/ ReConFig.2008.62. (Year: 2008).*

Grandi et al., "A Continuous Authentication Technique for XR Utilizing Time-Based One Time Passwords, Haptics, and Kinetic Activity," IEEE, Shanghai, China, 2023, pp. 959-960, doi: 10.1109/ VRW58643.2023.00322. (Year: 2023).*

"YubiKey Bio Series", [Online]. Retrieved from the Internet: URL: https: www.yubico.com products yubikey-bio-series , (Accessed on Nov. 19, 2023), 13 pgs.

"U.S. Appl. No. 18/444,105, Non Final Office Action mailed Jul. 2, 2025", 18 pgs.

"EMV—Integrated Circuit Card Specifications for Payment Systems", Book 1, Version 4.3, (Nov. 2011), 189 pgs.

"EMV—Integrated Circuit Card Specifications for Payment Systems", Book 2, Version 4.3, (Nov. 2011), 174 pgs.

"EMV—Integrated Circuit Card Specifications for Payment Systems", Book 3, Version 4.3, (Nov. 2011), 230 pgs.

"U.S. Appl. No. 18/444,105, Examiner Interview Summary mailed Sep. 19, 2025", 2 pgs.

Farghaly, Ahmed Hemdan, "EMV Application Specification :: Offline Data Authentication (ODA)—part I", [Online]. Retrieved from the Internet: URL: https: www.linkedin.com pulse emv-application-specification-offline-data-oda-part-farghaly, (Feb. 23, 2022), 13 pgs.

Farghaly, Ahmed Hemdan, "EMV Application Specification :: Offline Data Authentication (ODA)—part II", [Online]. Retrieved from the Internet: URL: https: www.linkedin.com pulse emv-application-specification-offline-data-oda-part-farghaly-1f, (Mar. 11, 2022), 11 pgs.

"U.S. Appl. No. 18/444,105, Response filed Oct. 2, 2025 to Non Final Office Action mailed Jul. 2, 2025", 14 pgs.

* cited by examiner

TWO FACTOR AUTHENTICATION DEVICES WITH ACCESSIBILITY FEATURES

TECHNICAL FIELD

The present invention relates generally to the field of electronic security and, more specifically, to devices designed to facilitate two-factor authentication (2FA) processes.

BACKGROUND

Two-factor authentication is a security mechanism that requires two distinct forms of identification in order to access a protected electronic resource such as a system or data. This method adds an additional layer of security to the standard single-factor authentication, which typically involves only a username and password or personal identification number (PIN). Two factor-authentication typically also requires a two-factor authentication code. The two-factor authentication code is a time-varying code that changes at fixed intervals. The two-factor authentication code may be generated by an algorithm in an authentication server and also a matching code may be generated by an algorithm executing in a device of the user. The codes may be algorithmically derived based upon a common seed value that is known to the server and the device of the user.

The codes may be generated by a device of the user such as a mobile device. In some examples, these codes may also be generated through the use of specialized devices called security fobs. A security fob, also known as a security token, is a physical device that an authorized user carries to grant access to a secured resource. These fobs may display the second factor two-factor authentication code, known as a one-time password (OTP), which the user must enter in conjunction with their known password to complete the authentication process.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
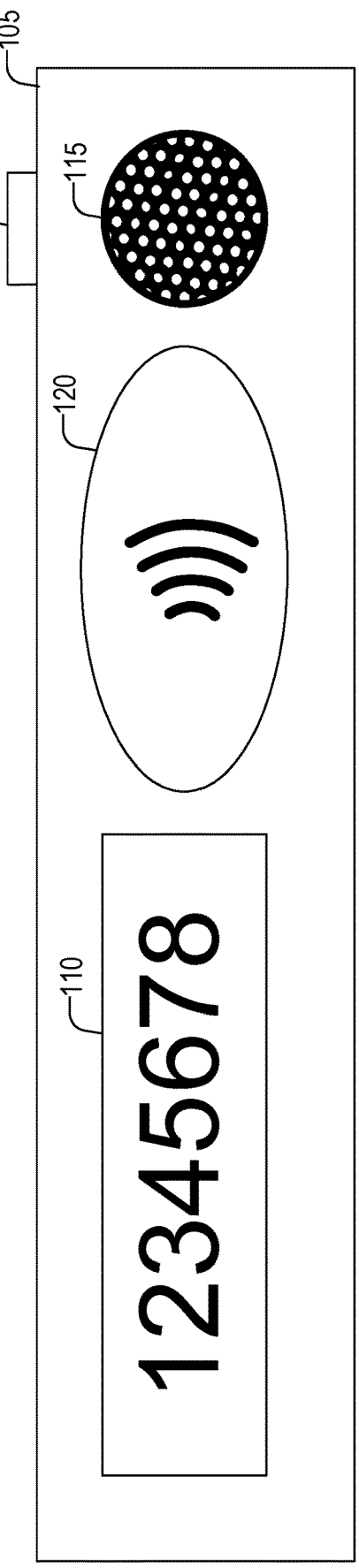
FIGS. 1-3 illustrate example two-factor authentication code generation device according to some examples of the present disclosure.

Traditional two-factor authentication code generation devices suffer from a number of problems. One of those problems stems from the lack of accessibility features. For example, two-factor authentication code generation devices in the form of a key fob display the two-factor authentication code on a display such as a liquid crystal display. Users who have sight impairments may have difficulty or be unable to see such displays.

Disclosed herein are two-factor authentication code generation devices, methods, and machine-readable mediums which provide alternative user interfaces for providing the two-factor code. In some examples, the two-factor authentication code generation device may include a speaker and number-to-speech logic that reads out the two-factor authentication code audibly. In other examples, the two-factor authentication code generation device may include an electromechanical device that provides the digits of the two-factor authentication code as raised dots according to a specified format, such as Braille. In still yet other examples, the device may provide haptics that provides a series of vibrational indicators that communicate the digits of the two-factor authentication code as vibrations whose value is indicated by either or both of the intensity, pattern, and/or location of the vibrations.

In some examples, the two-factor authentication code generation device may have a combination of different user interfaces, such as one or more of: a display, a haptic feedback device, a speaker, an electromechanical device, and the like. In some examples, the two-factor authentication code generation device may adapt to a particular context of the user. For example, if the user is in a public place where the two-factor authentication code may be overheard by another person, the system may switch to a haptic or electromechanical delivery mechanism to deliver the two-factor authentication code. The determination of which output device if the device has multiple output devices to use may be made by the user, or may be made based upon the location of the device. For example, at home, the device may have location profiles that select the output based upon a location of the device. The location may be determined, in some examples, using a receiver on the device for a Global Navigation Satellite System (GNSS).

Another problem with traditional two-factor authentication code generation devices is the lack of strong authentication of the device itself. The principle of two-factor authentication is that possession of the two-factor code generation device acts as a "key" in conjunction with the username and password. For certain transactions, additional security may be desired. For example, financial transactions involving a transfer of money may call for increased authentication.

Disclosed in some examples are methods, systems, and machine-readable mediums which provide for additional authentication of the user of the two-factor authentication code generation device prior to the output of the two-factor authentication code. Example additional authentication methods includes "card tap" authentication in which a user taps their Europay Mastercard Visa (EMV) enabled credit card on a Near Field Communication (NFC) reader integrated into the two-factor authentication code generation device. The two-factor authentication code generation device may then verify the card belongs to an authorized user. Other authentication techniques may include biometric scanners. That is, the two-factor authentication code generation device may include a biometric scanning device that verifies an identity of the user. Upon authenticating that the user is authorized to use the device, the system may then output the two-factor authentication code. These techniques provide additional security to the key fob.

In some examples, these additional authentication techniques may be used independently of the output mechanism—that is, they may be used on traditional devices with traditional user interfaces (e.g., displays). In other examples, the additional authentication techniques may be used along with the accessible user interfaces described herein. In addition, one or more of the techniques presented herein may be applied to two-factor authentication code generation devices that have form factors other than key fobs, such as mobile phones, laptops, desktops, tablets, infotainment systems for vehicles, and the like.

FIG. 1 illustrates one example two-factor authentication code generation device 105 according to some examples of the present disclosure. The two-factor authentication code generation device 105 includes a display 110, speaker 115, NFC reader 120, and button 125. Display 110 may display a one-time passcode generated by hardware processing logic in the device. Processing logic in the two-factor authentication code generation device 105 may convert the generated one-time passcode to speech which may be output by speaker 115. In some examples, the output is only provided through speaker 115 when the button 125 is depressed. This helps preserve the battery on the two-factor authentication code generation device 105 as the speaker 115 may utilize more power. In addition, it prevents annoyance to the user having to hear the spoken passcode constantly. In some examples, the passcode may not be generated until after the user has verified their identity by tapping a credit card, bank card, or other identity card that is equipped with EMV (Europay, Mastercard, and Visa) or other chip on NFC reader 120. For example, the system may utilize Static Data authentication (SDA), Dynamic Data Authentication (DDA), or Combined DDA (CDA) processes to validate the card offline.

Static Data Authentication (SDA) is a security mechanism employed in the EMV standard to ensure the integrity and authenticity of payment cards during offline transactions. SDA is designed to validate that the static data stored on a card's chip, such as the issuer's public key certificate and other sensitive application data, has not been tampered with or altered. This is achieved by verifying a digital signature, known as the Signed Static Application Data (SSAD), which is created by the card issuer and stored on the card. The SSAD is a cryptographic checksum that covers critical static data on the card, providing a means to detect any unauthorized modifications to the card's data.

The SDA process begins when a card is tapped on the NFC reader 120, and the two-factor authentication code generation device reads the relevant data from the card, including the issuer's public key certificate, the SSAD, and other static application data. The two-factor authentication code generation device then uses a stored Certification Authority (CA) public key to decrypt the issuer's public key certificate, thereby retrieving the issuer's public key. With the issuer's public key, the two-factor authentication code generation device verifies the SSAD against the static data read from the card. If the verification is successful, it confirms that the static data is authentic and has been signed by the issuer, thus validating the card's legitimacy. This verification process may prevent the use of counterfeit cards in offline transactions, as it ensures that the card presented is a genuine issued card and not a fraudulent copy.

The Signed Static Application Data (SSAD) is created using static data from the Integrated Circuit Card (ICC), which is selected by the card issuer. This data may include, but is not limited to, the Primary Account Number (PAN): The card number that uniquely identifies the cardholder's account; the application expiration date; the date through which the card application is valid; the cardholder's name; a service code that dictates card usage parameters, such as the allowed transaction types and geographical usage; and additional issuer-specified discretionary data that may include counters, keys, or other security-related information. The issuer's private key is used to digitally sign this collection of data, producing the SSAD. The SSAD is then stored on the card and used during the SDA process to verify the card's authenticity. The two-factor authentication code generation device performs this verification by using the issuer's public key to check the SSAD against the static data read from the card. If the data and the SSAD match, it confirms that the data has not been altered since the time of issuance, thereby establishing the card's authenticity.

Upon insertion of the EMV card into the two-factor authentication code generation device's card reader, the two-factor authentication code generation device initiates communication with the card's chip to select the appropriate payment application. Subsequently, the two-factor authentication code generation device issues commands to the card to retrieve the Application File Locator (AFL), which directs the two-factor authentication code generation device to the specific files and records on the card that contain the requisite data for transaction processing. Utilizing the AFL, the two-factor authentication code generation device accesses and reads these files and records, acquiring the static application data necessary for Static Data Authentication (SDA). This data includes, but is not limited to, the Primary Account Number (PAN) and the Application Expiration Date.

As part of the static data, the two-factor authentication code generation device also retrieves the Signed Static Application Data (SSAD) and the issuer's public key certificate. The SSAD, a digital signature generated and stored by the issuer, is used to verify the integrity of the static data. The issuer's public key certificate, encrypted by a trusted Certification Authority (CA), contains the issuer's public key. The two-factor authentication code generation device, equipped with the CA's public key, decrypts the issuer's public key certificate to extract the issuer's public key. This public key is then employed to authenticate the SSAD against the static data extracted from the card. A successful verification confirms the card's authenticity, ensuring that the static data has not been altered and the card has not been compromised.

The two-factor authentication code generation device may be programmed when it is issued to allow access by one or more identified individuals. That is, one or more items of static data from the SSAD (such as cardholder name and/or account number) of an authorized user may be programmed into the two-factor authentication code device. Upon tapping a card, the two-factor authentication code generation device may output the two-factor authentication code upon verifying that the fields from the SSAD programmed into the device match those from the card AND the SSAD from card is valid using SDA, DDA, or CDA (described below).

Dynamic Data Authentication (DDA) within the EMV framework is a security protocol that enhances the authentication process of payment cards during offline transactions. The protocol employs a unique digital signature mechanism, leveraging a card-specific key pair—comprising the Integrated Circuit Card (ICC) public and private keys—endorsed by the issuer's private key. The two-factor authentication code generation device initiates the authentication process by generating a nonce, a random number that serves as a challenge in the transaction, ensuring a unique signature for each interaction. This nonce is transmitted to the card via an EMV command, prompting the card to utilize its ICC private key to generate a digital signature of the nonce. The digital signature in some examples comprises a hash of the nonce value and a card specific value. The card then returns this digital signature and the card specific value to the two-factor authentication code generation device for verification.

To verify the digital signature, the two-factor authentication code generation device must first retrieve and reconstruct the ICC public key using the issuer's public key. The two-factor authentication code generation device obtains the issuer's public key by decrypting the Issuer Public Key Certificate, which is stored on the card and encrypted by a trusted Certification Authority (CA). The two-factor authentication code generation device, preloaded with the CA's public key, retrieves and decrypts the Issuer Public Key Certificate to extract the issuer's public key.

With the issuer's public key, the two-factor authentication code generation device proceeds to retrieve and decrypt the ICC Public Key Certificate, to obtain the full ICC public key. Utilizing the ICC public key, the two-factor authentication code generation device decrypts the digital signature received from the card. The digital signature includes the card specific value. If the decrypted signature matches a hash of the original nonce and the card specific value, the card is authenticated as genuine. This verification process ensures the card's presence and integrity, confirming that the card is not a cloned or fraudulent copy. The successful verification of the digital signature via DDA signifies a secure transaction, allowing the code display process to continue with confidence in the card's legitimacy.

Combined Dynamic Data Authentication (CDA) is an advanced security protocol used in EMV card transactions that combines the features of Dynamic Data Authentication (DDA) with the generation of an Application Cryptogram. CDA is designed to provide a higher level of security, particularly in offline environments, by ensuring the card's authenticity and the integrity of transaction data. CDA operates by performing the following steps. 1. Issuer and ICC Key Pairs: Similar to DDA, the card issuer generates a key pair consisting of a private and a public key. The card itself also has a unique ICC key pair. The issuer signs the ICC public key with its private key to create an ICC Public Key Certificate, which is stored on the card. 2. Two-factor authentication code generation device authentication of the card: During a transaction, the two-factor authentication code generation device retrieves the ICC Public Key Certificate and uses the issuer's public key to verify it. This step ensures that the ICC public key is indeed issued and certified by the legitimate card issuer. 3. Nonce Generation and Signature: The two-factor authentication code generation device generates a random number (nonce) and sends it to the card. The card then uses its ICC private key to sign not only the nonce but also critical transaction data, such as a most recently generated two-factor authentication code and the two-factor authentication code generation device verification results. This combined data is then sent back to the two-factor authentication code generation device as a digital signature. 3. Verification of Card and Transaction Data: The two-factor authentication code generation device uses the ICC public key to verify the digital signature. If the signature is valid, it confirms both the card's authenticity and the integrity of the transaction data. 4. Application Cryptogram: In addition to the digital signature, the card also generates an Application Cryptogram using the ICC private key. This cryptogram is a cryptographic summary of the transaction data. Completion of the Transaction: If the two-factor authentication code generation device successfully verifies the digital signature and the Application Cryptogram, it concludes that the card is genuine and the transaction data has not been tampered with. The two-factor authentication code generation device can then proceed to provide the two-factor authentication code to the user.

CDA defends against card cloning and skimming as it ensures that the card present during the transaction is the original card issued by the bank and that the transaction details have not been altered. It is particularly useful in environments where the transaction cannot be immediately verified online with the card issuer, as it provides a high level of assurance in the card's validity and the transaction's integrity.

Figure 2:
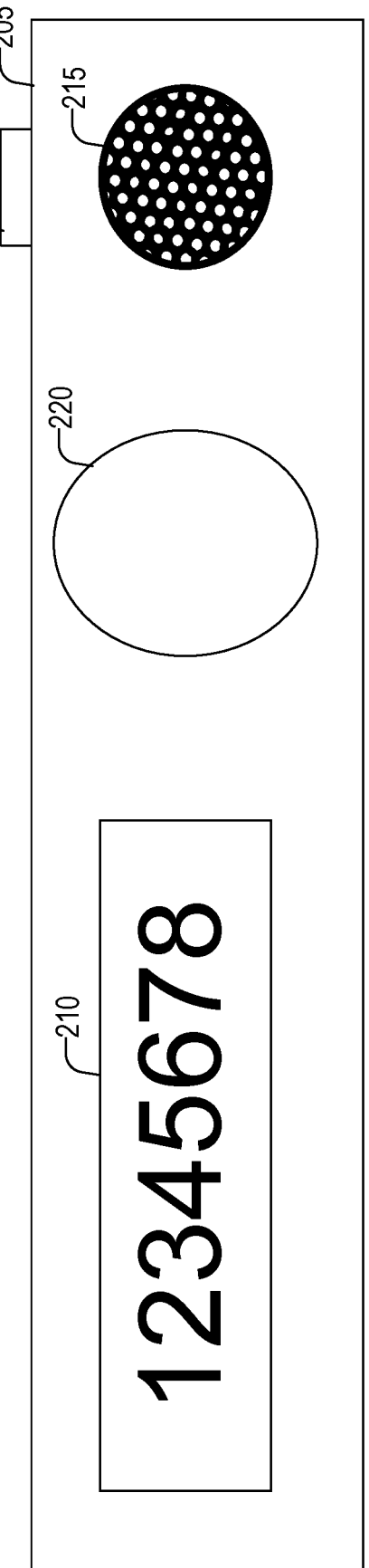

FIG. 2 illustrates a second example of a two-factor authentication code generation device 205 according to some examples of the present disclosure. Two-factor authentication code generation device 205 may include a display 210, speaker 215, biometric capture device 220, and button 225. Display 210 may display a one-time passcode generated by processing logic in the device. Processing logic in the two-factor authentication code generation device 205 may convert the generated one-time passcode to speech which may be output by speaker 215. In some examples, the output is only provided through speaker 215 when the button 225 is depressed. This helps preserve the battery on the two-factor authentication code generation device 205 as the speaker 215 may utilize more power. In addition, it prevents annoyance to the user having to hear the spoken passcode constantly. In some examples, the passcode may not be generated until after the user has verified their identity by submitting a biometric sample using biometric capture device 220. Biometric capture device 220 may be a finger or thumbprint reader, iris scanner, facial recognition camera, voice analysis microphone, or the like. The captured biometric of the user may be compared to a pre-stored template. The prestored template may be programmed into the device when it was issued to the user. This may be done using the biometric capture device 220 of the device in a setup mode that may be restricted (e.g., through e-fuses, fuses, or the like) to a first use. In other examples, the setup mode may be restricted through other means, such as via administrator passwords, device jumpers, or the like. The prestored template may be stored in the memory of the device.

Figure 3:
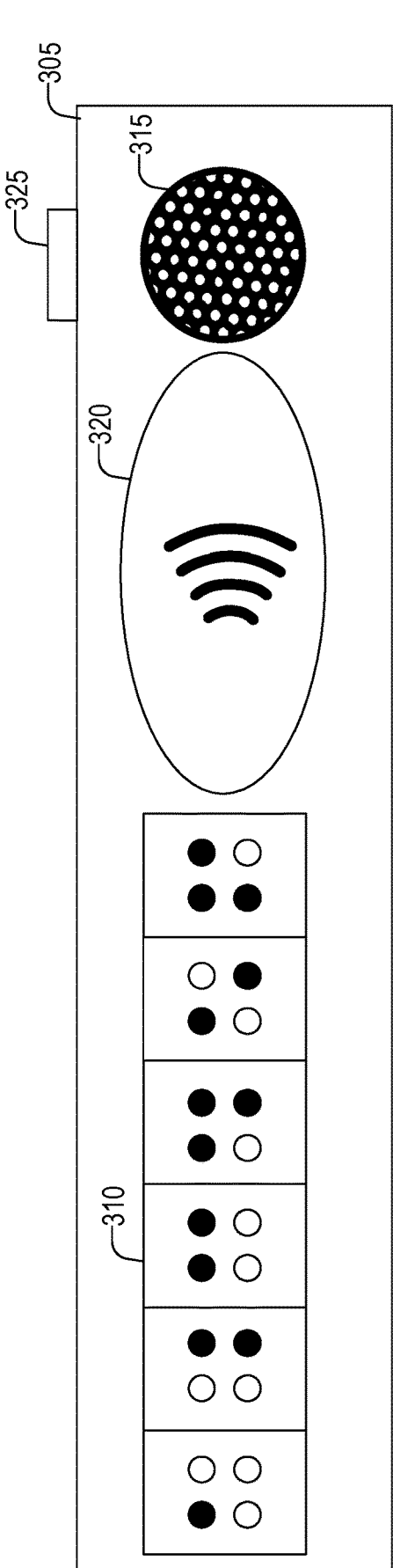

FIG. 3 illustrates a third example of a two-factor authentication code generation device according to some examples of the present disclosure. FIG. 3 illustrates a device 305 with an electromechanical pin array 310, speaker 315, NFC reader 320, and button 325. Electromechanical pin array 310 may display a one-time passcode generated by processing logic in the device. For example, each of the six sections may display one digit of the one-time passcode (six digits are shown, but fewer or additional digits may be utilized). Each of the six sections may have one or more electromechanical pins. Shown in FIG. 3, there are four pins for each digit. The pins may raise and lower from the device based upon electromagnets. The pins may raise and lower to identify a digit in the particular position. In some examples, the digit may be represented using Braille. In the example of FIG. 3, the passcode displays a Braille representation of "123456."

In addition, in some examples, the processing logic in the two-factor authentication code generation device 205 may convert the generated one-time passcode to speech which may be output by speaker 315. In some examples, the output is only provided through speaker 315 and/or the electromechanical pin array 310 when the button 325 is depressed. This helps preserve the battery on the two-factor authentication code generation device 305 as the speaker 315 and electromechanical pin array 310 may utilize more power. In addition, it prevents annoyance to the user having to hear the spoken passcode constantly and/or to feel the raising and lowering of the pins constantly. In some examples, the passcode may not be generated until after the user has verified their identity by tapping their credit card or other card to NFC reader 320 as previously described.

Each pin of the electromechanical pin array may be, for example, operated using a small solenoid that extends the pin upon activation or cessation of an electric current through the solenoid or extends the pin upon application of current in a first direction and retracts upon application of current in a second direction.

Figure 4:
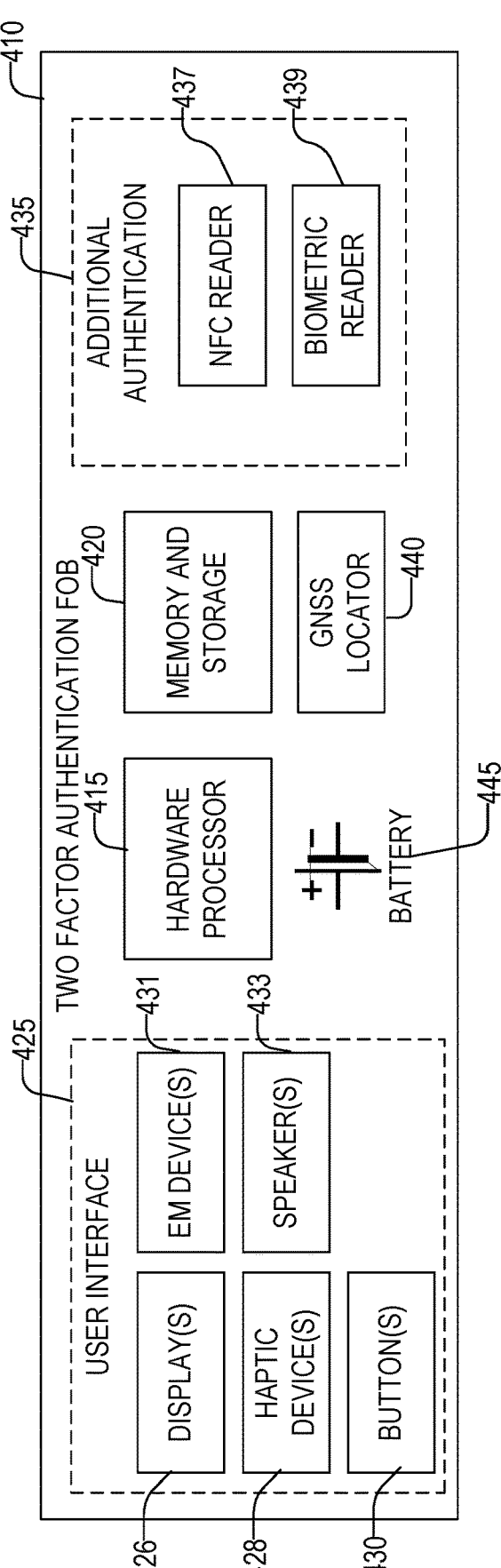
FIG. 4 illustrates a logical block diagram of a two-factor authentication code generation device according to some examples of the present disclosure.

FIG. 4 illustrates a logical block diagram of a two-factor authentication code generation device 410 according to some examples of the present disclosure. Hardware processor 415 may be a microprocessor, a central processing unit (CPU), an application specific integrated circuit (ASIC) or the like. Hardware processor 415 may be specially designed to perform the operations described herein exclusively in hardware, or the hardware processor 415 may execute one or more instructions, which may be stored in memory and storage 420. The instructions may cause the hardware processor 415 to perform the operations disclosed herein.

Example operations performed by hardware processor 415 may include generating a two factor two-factor authentication code. Such codes may be generated according to one or more methods. Example methods may include a Time-Based One-Time Password (TOTP) which generate a one-time password using a shared secret key and the current time as inputs. The password changes at fixed intervals (usually every 30 seconds), an HMAC Based One-Time Password (HOTP) which generates a OTP using a counter that increments with each new code generation, or the like. The server and the token-generating device both maintain the counter, ensuring they are synchronized. In some examples, the methods may utilize a seed or timer that is shared between the server and the two-factor authentication code generation device 410. This value may be pre-programmed into the device and may be stored in memory and storage 420.

Memory and storage 420 may be one or more of: random access memory, read-only memory, flash memory, solid state memory, and the like. Memory and storage 420 may be a machine-readable medium that may store one or more instructions that are provided to hardware processor 415. Hardware processor 415 may utilize the memory and storage 420 to store values during execution of the instructions.

GNSS locator 440 may receive one or more GNSS signals, such as Global Positioning System (GPS) signals and use those signals to locate the two-factor authentication code generation device 410. The location may then be used by the hardware processor 415 to apply one or more location profiles that may be stored in memory and storage 420 to apply one or more preferences for which user interfaces 425 to activate based upon the location. The profiles may be customized by the user, e.g., through interfacing with an external device such as a smartphone or desktop computer through an external interface (not shown) such as Bluetooth or USB. Battery 445 may be a power source such as a rechargeable battery, coin cell battery, AA or AAA battery or batteries, or the like. Battery 445 may be replaceable or integrated. Battery 445 may provide power for the two-factor authentication code generation device 410.

User interfaces 425 may comprise, depending on the configuration of the two-factor authentication code generation device 410, one or more of: display(s) 426, haptic device(s) 428, physical button(s) 430, electromechanical display device(s) 431, and/or a speaker(s) 433. Display(s) 426 may be liquid crystal display (LCD), Light Emitting Diode (LED) display, Organic Light Emitting Diode (OLED) display, e-ink display, or the like. Haptic device(s) 428 may comprise one or more haptic feedback generators positioned within the two-factor authentication code generation device 410. In some examples, the location, amplitude, frequency, and pattern of the haptic feedback may be used to indicate the OTP generated by the hardware processor 415. For example, a digit may be represented by a vibration for each incremental value (e.g., the number one would be one vibration; two would be two vibrations; and the like). Digits may be separated by an extra-long vibration. The hardware processor 415 may convert the OTP into haptic feedback using one or more haptic profiles.

Buttons 430 may control the output of the OTP through the other user interface methods. Electromechanical display device 431 is of the form as previously described and may be actuated using small electromagnetic devices such as solenoids. The activation of the solenoids may be specified by a profile. That is, a first digit value may be activated based upon a profile that matches that value. Speaker may be a standard speaker that outputs audio from hardware processor 415 that converts the OTP to voice. For example, each digit may have an associated audio file stored in memory and storage 420. The hardware processor 415 may load each file in sequence and send it to the speaker 433. For example, for a OTP "123456," the processor may load from memory and play the audio files for "1," "2," "3," "4," "5," and "6" in sequence.

Additional authentication components 435 may include an NFC reader 437 and associated EMV logic—which may reside on the NFC reader 437 (e.g., in a microprocessor of the NFC reader 437) or may reside in the hardware processor 415, or in instructions stored in memory and storage 420 which cause the processor to perform the EMV operations. In some examples, biometric reader 439 may be one or more of a fingerprint reader, iris reader, facial recognition camera, microphone for voice recognition, and the like. The biometric reader, the hardware processor 415, or both may compare a biometric sample with a pre-stored template. If the sample matches the template the user is authenticated and the hardware processor 415 may send the OTP to one of the user interface devices for output.

Figure 5:
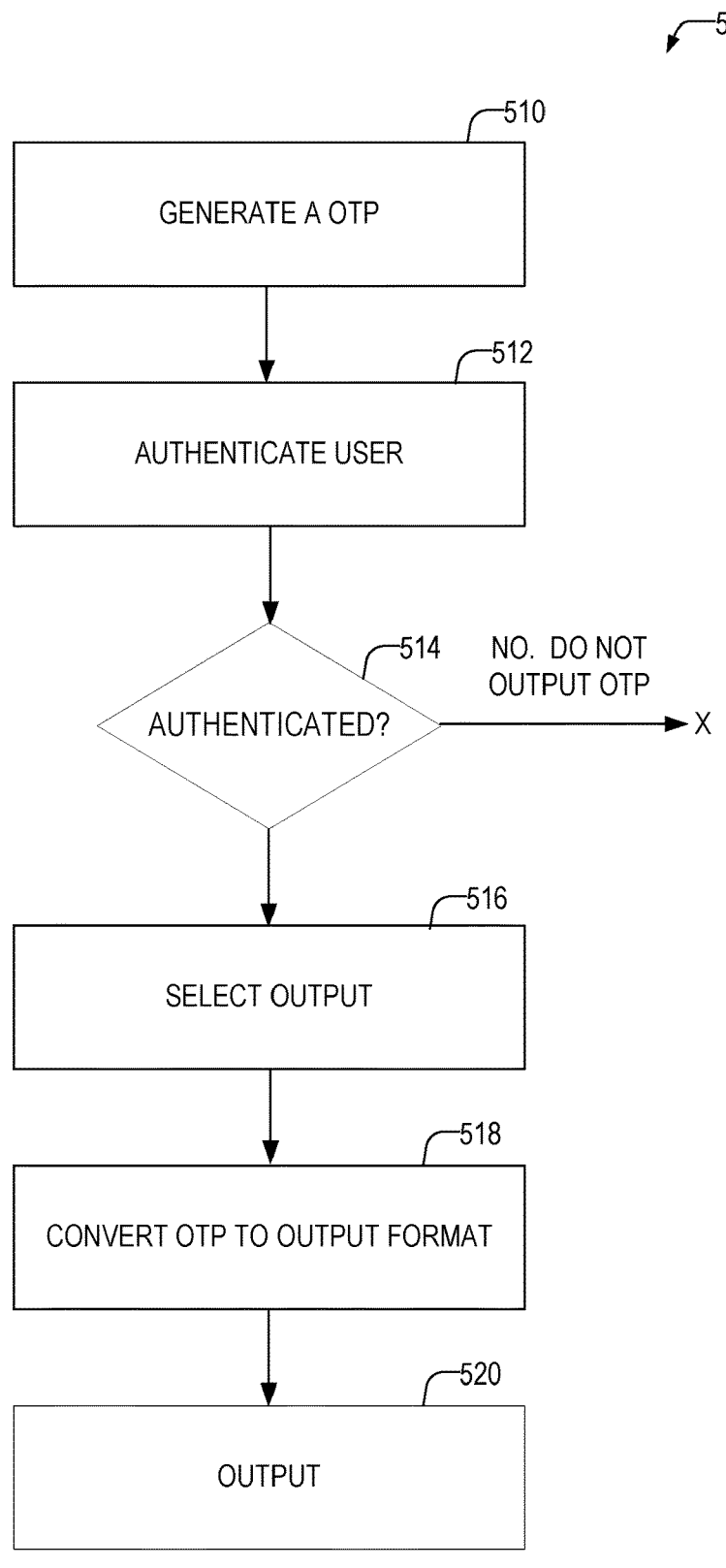
FIG. 5 illustrates a flowchart of a method of providing a OTP according to some examples of the present disclosure.

FIG. 5 illustrates a flowchart of a method 500 of providing a OTP according to some examples of the present disclosure. At operation 510, the device may generate a OTP. The OTP may be time based, Hash-Based Message Authentication Code (HMAC) based, or the like. This may be a periodic generation, e.g., a new code is generated every prespecified period of time. In other examples, this may happen responsive to user input. At operation 512, the device may optionally authenticate the user. For example, using biometric input, an EMV card tap input, or the like. If additional authentication is performed at operation 512, a determination is made at operation 514 as to whether the authentication succeeded. If the authentication failed, the method ends. If the authentication was successful, the system may select an output at operation 516. The output may be selected, for example, based upon a location of the device as previously described. In other examples, the output may be selected based upon the depression or position of one or more physical buttons.

At operation 518, based upon the outputs selected at operation 516 and based upon format information stored in memory of the device, the OTP may be converted to an output format. For example, the OTP may be converted to a voice output, a digital display output (e.g., using a display driver), an electromechanical sequence representing the digits in Braille, a series of one or more haptics, or the like. At operation 520, the OTP may be output on the selected output devices.

Figure 6:
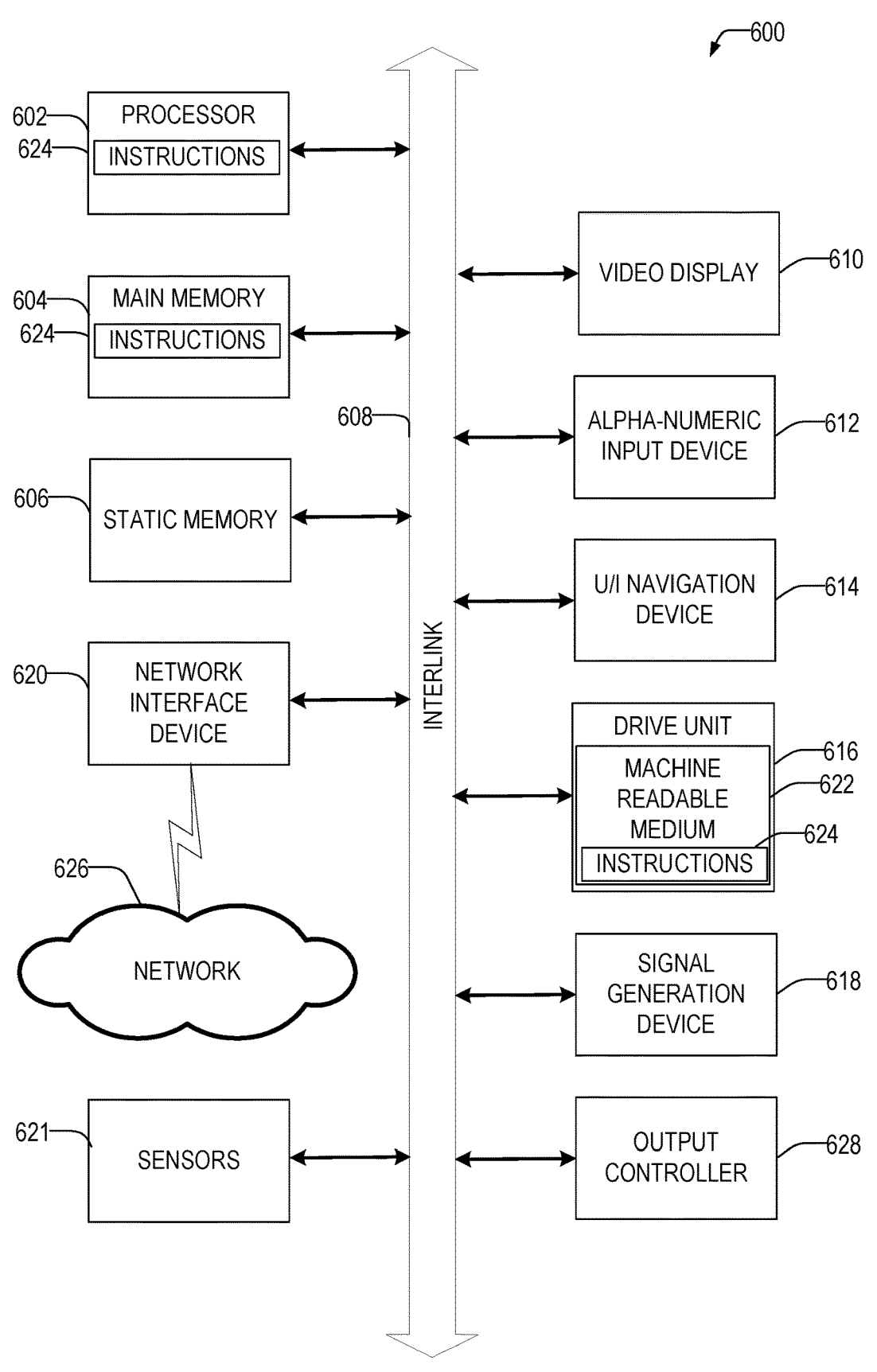
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein may be performed. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be in the form of a two-factor generation device, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. Machine may be, or be configured to be the two-factor authentication code generation device of FIGS. 1-4 and perform the method of FIG. 5.

Examples, as described herein, may include, or may operate on one or more logic units, components, or mechanisms (hereinafter "components"). Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine readable medium. In an example, the software, when executed by the underlying hardware of the component, causes the hardware to perform the specified operations of the component.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which component are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular module at one instance of time and to constitute a different component at a different instance of time.

Machine (e.g., computer system) 600 may include one or more hardware processors, such as processor 602. Processor 602 may be a central processing unit (CPU), a graphics processing unit (GPU), a hardware processor core, or any combination thereof. Machine 600 may include a main memory 604 and a static memory 606, some or all of which may communicate with each other via an interlink (e.g., bus) 608. Examples of main memory 604 may include Synchronous Dynamic Random-Access Memory (SDRAM), such as Double Data Rate memory, such as DDR4 or DDR5. Interlink 608 may be one or more different types of interlinks such that one or more components may be connected using a first type of interlink and one or more components may be connected using a second type of interlink. Example interlinks may include a memory bus, a peripheral component interconnect (PCI), a peripheral component interconnect express (PCIe) bus, a universal serial bus (USB), or the like.

The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 624 may further be transmitted or received over a communications network 626 using a transmission medium via the network interface device 620. The Machine 600 may communicate with one or more other machines wired or wirelessly utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks such as an Institute of Electrical and Electronics Engineers (IEEE) 802.11 family of standards known as Wi-Fi®, an IEEE 802.15.4 family of standards, a 5G New Radio (NR) family of standards, a Long Term Evolution (LTE) family of standards, a Universal Mobile Telecommunications System (UMTS) family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques.

OTHER NOTES AND EXAMPLES

Example 1 is a two-factor authentication code generation device comprising: a speaker; a hardware circuit, the hardware circuit configured to perform operations comprising: generating a two-factor authentication code; converting the two-factor authentication code into human speech; and outputting a control signal to cause the speaker to play the human speech.

In Example 2, the subject matter of Example 1 includes, a button; and wherein the operations comprise outputting a control signal to cause the speaker to play the human speech only responsive to activation of the button.

In Example 3, the subject matter of Examples 1-2 includes, a near-field communication reader; a memory storing a first public key; and wherein the operations further comprise: identifying a NFC enabled card was presented to the near-field communication reader; responsive to the identifying the NFC enabled card was presented: generating a nonce; transmitting the nonce to the NFC enabled card; receiving a digital signature from the NFC enabled card responsive to transmission of the nonce; receiving a first signed certificate from the NFC enabled card through the near-field communication reader; decrypting the first signed certificate using the first public key to obtain a second public key; receive a second certificate from the NFC enabled card through the near-field communication reader; decrypting the second certificate with the second public key to obtain a third public key; decrypt the digital signature using the third public key to obtain a second nonce; comparing the nonce and second nonce; and wherein one or more of: the playing the human speech or the generating the two-factor authentication code are performed only upon a comparison result indicating that the nonce and the second nonce match.

In Example 4, the subject matter of Examples 1-3 includes, a near-field communication reader; a memory storing a first public key; and wherein the operations further comprise: identifying a NFC enabled card was presented to the near-field communication reader; responsive to the identifying the NFC enabled card was presented: reading a signed static application data from the NFC enabled card; reading an item of static data from the NFC enabled card; reading a first certificate from the NFC enabled card through the near-field communication reader; decrypting the first certificate using the first public key to obtain a second public key; decrypting the signed static application data with the second public key; verifying that a portion of the decrypted signed static application data matches the item of static data; and one or more of: playing the human speech or generating the two-factor authentication code are performed only upon verifying that the portion of the decrypted signed static application data matches the item of static data.

In Example 5, the subject matter of Example 4 includes, wherein the static data comprises one or more of: a cardholder name, an account number, expiration date, or a service code.

In Example 6, the subject matter of Examples 1-5 includes, a grid of a plurality of electromagnetic pins actuatable to extend from the two-factor authentication code generation device; wherein the operations further comprise: actuating ones of the electromagnetic pins in a defined pattern to represent the two-factor authentication code.

In Example 7, the subject matter of Example 6 includes, wherein the defined pattern is Braille.

In Example 8, the subject matter of Examples 1-7 includes, a haptic feedback unit; wherein the operations further comprise: actuating the haptic feedback unit in a defined pattern to represent the two-factor authentication code.

In Example 9, the subject matter of Examples 1-8 includes, a biometric reader; a memory to store a biometric template; wherein the operations further comprise: receiving a biometric sample from the biometric reader; comparing the biometric sample to the biometric template; and wherein generating the two-factor authentication code is performed only upon a comparison result indicating that the biometric template and the biometric sample match within a threshold amount.

In Example 10, the subject matter of Example 9 includes, wherein the biometric reader is one of: a fingerprint reader, an iris scanner, or a facial recognition camera.

Example 11 is a two-factor authentication code generation method comprising: utilizing a hardware circuit to perform operations comprising: generating a two-factor authentication code; converting the two-factor authentication code into human speech; and playing the human speech through a speaker.

In Example 12, the subject matter of Example 11 includes, outputting a control signal to cause the speaker to play the human speech only responsive to activation of a button communicatively coupled to the hardware circuit.

In Example 13, the subject matter of Examples 11-12 includes, wherein the operations further comprise: identifying a NFC enabled card was presented to a near-field communication reader communicatively coupled to the hardware circuit; responsive to the identifying the NFC enabled card was presented: generating a nonce; transmitting the nonce to the NFC enabled card; receiving a digital signature from the NFC enabled card responsive to transmission of the nonce; receiving a first signed certificate from the NFC enabled card through the near-field communication reader; decrypting the first signed certificate using a first public key stored in a memory communicatively coupled to the hardware circuit to obtain a second public key; receive a second certificate from the NFC enabled card through the near-field communication reader; decrypting the second certificate with the second public key to obtain a third public key; decrypt the digital signature using the third public key to obtain a second nonce; comparing the nonce and second nonce; and wherein one or more of: the playing the human speech or the generating the two-factor authentication code are performed only upon a comparison result indicating that the nonce and the second nonce match.

In Example 14, the subject matter of Examples 11-13 includes, wherein the operations further comprise: identifying a NFC enabled card was presented to a near-field communication reader communicatively coupled to the hardware circuit; responsive to the identifying the NFC enabled card was presented: reading a signed static application data from the NFC enabled card; reading an item of static data from the NFC enabled card; reading a first certificate from the NFC enabled card through the near-field communication reader; decrypting the first certificate using a first public key stored in a memory communicatively coupled to the hardware circuit to obtain a second public key; decrypting the signed static application data with the second public key; verifying that a portion of the decrypted signed static application data matches the item of static data; and one or more of: playing the human speech or generating the two-factor authentication code are performed only upon verifying that the portion of the decrypted signed static application data matches the item of static data.

In Example 15, the subject matter of Example 14 includes, wherein the static data comprises one or more of: a cardholder name, an account number, expiration date, or a service code.

In Example 16, the subject matter of Examples 11-15 includes, wherein the operations further comprise: actuating ones of a grid of a plurality of electromagnetic pins actuatable to extend from a two-factor authentication code generation device in a defined pattern to represent the two-factor authentication code.

In Example 17, the subject matter of Example 16 includes, wherein the defined pattern is Braille.

In Example 18, the subject matter of Examples 11-17 includes, wherein the operations further comprise: actuating a haptic feedback unit in a defined pattern to represent the two-factor authentication code.

In Example 19, the subject matter of Examples 11-18 includes, wherein the operations further comprise: receiving a biometric sample from a biometric reader; comparing the biometric sample to a stored biometric template; and wherein generating the two-factor authentication code is performed only upon a comparison result indicating that the biometric template and the biometric sample match within a threshold amount.

In Example 20, the subject matter of Example 19 includes, wherein the biometric reader is one of: a fingerprint reader, an iris scanner, or a facial recognition camera.

Example 21 is a non-transitory machine-readable medium, storing instructions for two-factor authentication code generation, the instructions, which when executed by a hardware circuit, cause the hardware circuit to perform operations comprising: utilizing a hardware circuit to perform operations comprising: generating a two-factor authentication code; converting the two-factor authentication code into human speech; and playing the human speech through a speaker.

In Example 22, the subject matter of Example 21 includes, outputting a control signal to cause the speaker to play the human speech only responsive to activation of a button communicatively coupled to the hardware circuit.

In Example 23, the subject matter of Examples 21-22 includes, wherein the operations further comprise: identifying a NFC enabled card was presented to a near-field communication reader communicatively coupled to the hardware circuit; responsive to the identifying the NFC enabled card was presented: generating a nonce; transmitting the nonce to the NFC enabled card; receiving a digital signature from the NFC enabled card responsive to transmission of the nonce; receiving a first signed certificate from the NFC enabled card through the near-field communication reader; decrypting the first signed certificate using a first public key stored in a memory communicatively coupled to the hardware circuit to obtain a second public key; receive a second certificate from the NFC enabled card through the near-field communication reader; decrypting the second certificate with the second public key to obtain a third public key; decrypt the digital signature using the third public key to obtain a second nonce; comparing the nonce and second nonce; and wherein one or more of: the playing the human speech or the generating the two-factor authentication code are performed only upon a comparison result indicating that the nonce and the second nonce match.

In Example 24, the subject matter of Examples 21-23 includes, wherein the operations further comprise: identifying a NFC enabled card was presented to a near-field communication reader communicatively coupled to the hardware circuit; responsive to the identifying the NFC enabled card was presented: reading a signed static application data from the NFC enabled card; reading an item of static data from the NFC enabled card; reading a first certificate from the NFC enabled card through the near-field communication reader; decrypting the first certificate using a first public key stored in a memory communicatively coupled to the hardware circuit to obtain a second public key; decrypting the signed static application data with the second public key; verifying that a portion of the decrypted signed static application data matches the item of static data; and one or more of: playing the human speech or generating the two-factor authentication code are performed only upon verifying that the portion of the decrypted signed static application data matches the item of static data.

In Example 25, the subject matter of Example 24 includes, wherein the static data comprises one or more of: a cardholder name, an account number, expiration date, or a service code.

In Example 26, the subject matter of Examples 21-25 includes, wherein the operations further comprise: actuating ones of a grid of a plurality of electromagnetic pins actuatable to extend from a two-factor authentication code generation device in a defined pattern to represent the two-factor authentication code.

In Example 27, the subject matter of Example 26 includes, wherein the defined pattern is Braille.

In Example 28, the subject matter of Examples 21-27 includes, wherein the operations further comprise: actuating a haptic feedback unit in a defined pattern to represent the two-factor authentication code.

In Example 29, the subject matter of Examples 21-28 includes, wherein the operations further comprise: receiving a biometric sample from a biometric reader; comparing the biometric sample to a stored biometric template; and wherein generating the two-factor authentication code is performed only upon a comparison result indicating that the biometric template and the biometric sample match within a threshold amount.

In Example 30, the subject matter of Example 29 includes, wherein the biometric reader is one of: a fingerprint reader, an iris scanner, or a facial recognition camera.

Example 31 is at least one machine-readable medium including instructions that, when executed by processing circuitry, cause the processing circuitry to perform operations to implement of any of Examples 1-30.

Example 32 is an apparatus comprising means to implement of any of Examples 1-30.

Example 33 is a system to implement of any of Examples 1-30.

Example 34 is a method to implement of any of Examples 1-30.

What is claimed is:

1. A two-factor authentication code generation device comprising:
a near-field communication (NFC) reader;
a memory storing a first public key;
a speaker;
a hardware circuit, the hardware circuit configured to perform operations comprising:
identifying a NFC enabled card was presented to the near-field communication reader;
responsive to the identifying the NFC enabled card was presented:
generating a nonce;
transmitting the nonce to the NFC enabled card;
receiving a digital signature from the NFC enabled card responsive to transmission of the nonce;
receiving a first signed certificate from the NFC enabled card through the near-field communication reader;
decrypting the first signed certificate using the first public key to obtain a second public key;
receiving a second certificate from the NFC enabled card through the near-field communication reader;
decrypting the second certificate with the second public key to obtain a third public key;
decrypting the digital signature using the third public key to obtain a second nonce;
comparing the nonce and second nonce;
responsive to determining that a comparison result indicates that the nonce and the second nonce match:
converting a two-factor authentication code into human speech;
and playing the human speech through the speaker;
wherein one or more of the converting of the two-factor authentication code and the playing the human speech through the speaker occur only when the comparison result indicates that the nonce and the second nonce match.

2. The two-factor authentication code generation device of claim 1, further comprising:
a button; and
wherein the operations comprise playing the human speech through the speaker only responsive to activation of the button.

3. The two-factor authentication code generation device of claim 1, further comprising:
a grid of a plurality of electromagnetic pins actuatable to extend from the two-factor authentication code generation device, and wherein the operations further comprise: actuating ones of the electromagnetic pins in a defined pattern to represent the two-factor authentication code.

4. The two-factor authentication code generation device of claim 3, wherein the defined pattern is Braille.

5. The two-factor authentication code generation device of claim 1, further comprising:
a haptic feedback unit; and
wherein the operations further comprise: actuating the haptic feedback unit in a defined pattern to represent the two-factor authentication code.

6. The two-factor authentication code generation device of claim 1, further comprising:
a biometric reader;
a memory to store a biometric template;
wherein the operations further comprise:
receiving a biometric sample from the biometric reader;
comparing the biometric sample to the biometric template; and
wherein generating the two-factor authentication code is performed only upon a comparison result indicating that the biometric template and the biometric sample match within a threshold amount.

7. The two-factor authentication code generation device of claim 6, wherein the biometric reader is one of: a fingerprint reader, an iris scanner, or a facial recognition camera.

8. A two-factor authentication code generation method comprising:
utilizing a hardware circuit to perform operations comprising:
identifying a NFC enabled card was presented to a near-field communication reader;
responsive to the identifying the NFC enabled card was presented:
generating a nonce;
transmitting the nonce to the NFC enabled card;
receiving a digital signature from the NFC enabled card responsive to transmission of the nonce;
receiving a first signed certificate from the NFC enabled card through the near-field communication reader;
decrypting the first signed certificate using a first public key stored in a memory to obtain a second public key;
receiving a second certificate from the NFC enabled card through the near-field communication reader;
decrypting the second certificate with the second public key to obtain a third public key;
decrypting the digital signature using the third public key to obtain a second nonce;
comparing the nonce and second nonce;
responsive to determining that a comparison result indicates that the nonce and the second nonce match:
converting a two-factor authentication code into human speech; and
playing the human speech through a speaker;
wherein one or more of the converting of the two-factor authentication code and the playing the human speech through the speaker occur only when the comparison result indicates that the nonce and the second nonce match.

9. The two-factor authentication code generation method of claim 8, further comprising outputting a control signal to cause the speaker to play the human speech only responsive to activation of a button communicatively coupled to the hardware circuit.

10. The two-factor authentication code generation method of claim 8, wherein the operations further comprise: actuating ones of a grid of a plurality of electromagnetic pins actuatable to extend from a two-factor authentication code generation device in a defined pattern to represent the two-factor authentication code.

11. The two-factor authentication code generation method of claim 10, wherein the defined pattern is Braille.

12. The two-factor authentication code generation method of claim 8, wherein the operations further comprise: actuating a haptic feedback unit in a defined pattern to represent the two-factor authentication code.

13. The two-factor authentication code generation method of claim 8, wherein the operations further comprise:

receiving a biometric sample from a biometric reader;
comparing the biometric sample to a stored biometric template; and
wherein generating the two-factor authentication code is performed only upon a comparison result indicating that the biometric template and the biometric sample match within a threshold amount.

14. The two-factor authentication code generation method of claim 13, wherein the biometric reader is one of: a fingerprint reader, an iris scanner, or a facial recognition camera.

15. A two-factor authentication code generation device comprising:

a near-field communication (NFC) reader;
a memory storing a first public key;
a speaker;
a hardware circuit, the hardware circuit configured to perform operations comprising:
identifying a NFC enabled card was presented to the near-field communication reader;
responsive to the identifying the NFC enabled card was presented:
reading a signed static application data from the NFC enabled card;
reading an item of static data from the NFC enabled card;
reading a first certificate from the NFC enabled card through the near-field communication reader;
decrypting the first certificate using the first public key to obtain a second public key;
decrypting the signed static application data with the second public key;
verifying that a portion of the decrypted signed static application data matches the item of static application data;
responsive to determining that the portion of the decrypted signed static application data matches the item of static application data:
converting a two-factor authentication code into human speech; and
playing the human speech through the speaker;
wherein one or more of the converting of the two-factor authentication code and the playing the human speech through the speaker occur only when the comparison result indicates that the nonce and the second nonce match.

16. The two-factor authentication code generation device of claim 15, further comprising:

a button; and
wherein the operations comprise playing the human speech only responsive to activation of the button.

17. The two-factor authentication code generation device of claim 1, further comprising;

a grid of a plurality of electromagnetic pins actuatable to extend from the two-factor authentication code generation device; and
wherein the operations further comprise: actuating ones of the electromagnetic pins in a defined pattern to represent the two-factor authentication code.

18. The two-factor authentication code generation device of claim 17, wherein the defined pattern is Braille.

19. The two-factor authentication code generation device of claim 15, further comprising:

a haptic feedback unit; and
wherein the operations further comprise: actuating the haptic feedback unit in a defined pattern to represent the two-factor authentication code.

20. The two-factor authentication code generation device of claim 15, further comprising:

a biometric reader;
a memory to store a biometric template;
wherein the operations further comprise:
receiving a biometric sample from the biometric reader;
comparing the biometric sample to the biometric template; and
wherein generating the two-factor authentication code is performed only upon a comparison result indicating that the biometric template and the biometric sample match within a threshold amount.

21. The two-factor authentication code generation device of claim 20, wherein the biometric reader is one of: a fingerprint reader, an iris scanner, or a facial recognition camera.

22. A two-factor authentication code generation method comprising:

utilizing a hardware circuit to perform operations comprising:
a hardware circuit, the hardware circuit configured to perform operations comprising:
identifying a NFC enabled card was presented to a near-field communication reader;
responsive to the identifying the NFC enabled card was presented:
reading a signed static application data from the NFC enabled card;
reading an item of static data from the NFC enabled card;
reading a first certificate from the NFC enabled card through the near-field communication reader;
decrypting the first certificate using a first public key stored in a memory to obtain a second public key;
decrypting the signed static application data with the second public key;
verifying that a portion of the decrypted signed static application data matches the item of static application data;
responsive to determining that the portion of the decrypted signed static application data matches the item of static application data:
converting a two-factor authentication code into human speech; and
playing the human speech through a speaker;
wherein one or more of the converting of the two-factor authentication code and the playing the human speech through the speaker occur only when the comparison result indicates that the nonce and the second nonce match.

23. The two-factor authentication code generation method of claim 22, further comprising outputting a control signal to cause the speaker to play the human speech only responsive to activation of a button communicatively coupled to the hardware circuit.

24. The two-factor authentication code generation method of claim 22, wherein the operations further comprise: actuating ones of a grid of a plurality of electromagnetic pins actuatable to extend from a two-factor authentication code generation device in a defined pattern to represent the two-factor authentication code.

25. The two-factor authentication code generation method of claim 24, wherein the defined pattern is Braille.

26. The two-factor authentication code generation method of claim 22, wherein the operations further comprise: actuating a haptic feedback unit in a defined pattern to represent the two-factor authentication code.

27. The two-factor authentication code generation method of claim 22, wherein the operations further comprise:

receiving a biometric sample from a biometric reader;

comparing the biometric sample to a stored biometric template; and wherein generating the two-factor authentication code is performed only upon a comparison result indicating that the biometric template and the biometric sample match within a threshold amount.

28. The two-factor authentication code generation method of claim 27, wherein the biometric reader is one of: a fingerprint reader, an iris scanner, or a facial recognition camera.

\* \* \* \* \*